July 2, 1968 C. W. HELM 3,390,884

SOUND TRANSLATING APPARATUS

Filed Feb. 8, 1965 3 Sheets-Sheet 1

INVENTOR

CHARLES W. HELM

BY Raymond Wootten

ATTORNEY

July 2, 1968 C. W. HELM 3,390,884

SOUND TRANSLATING APPARATUS

Filed Feb. 8, 1965 3 Sheets-Sheet 2

INVENTOR

CHARLES W. HELM

BY Raymond Whitten

ATTORNEY

SOUND TRANSLATING APPARATUS

Filed Feb. 8, 1965

INVENTOR
CHARLES W. HELM
BY Raymond W. Colton
ATTORNEY 3,390,884

SOUND TRANSLATING APPARATUS

Charles W. Helm, Rocky Hill, Conn., assignor to The Gray Manufacturing Company, a corporation of Connecticut Filed Feb. 8, 1965, Ser. No. 431,135
16 Claims. (Cl. 274—17)

ABSTRACT OF THE DISCLOSURE

Loading and unloading tray for sound translating apparatus of the type employing continuous belt record media wherein the tray is removable and is employed to support the record medium during the advancing and retracting of said medium relative to the rotating drums which support the medium when installed in the apparatus, the tray having a base and oppositely disposed side walls extending upwardly therefrom and being slidably removable from the apparatus whereby the record medium may be stored on the tray prior to and after use.

This invention relates to sound translating or sound transducing apparatus and particularly to such apparatus employing record media of belt form. The invention is concerned primarily with the loading and unloading of such belt media with respect to a pair of drums or mandrels in a simple and reliable fashion.

In conjunction with previously known sound translating apparatus employing belt media, application of such media to the mandrels and removal of such media from the mandrels has required two-hand manipulation while providing no assurance that the belt would be seated properly with respect to the drums and the transducer employed to produce a recording on the medium or reproduce previously recorded intelligence.

It is among the objects of the present invention to provide sound translating apparatus having a frame, a pair of drums each rotatably supported at one end by the frame to receive on their other ends an endless belt record medium, a transducer movably mounted on the frame to scan the medium in a direction axially of the drums, and means for rotating the drums and imparting scanning movement to the transducer; a carrier for the record medium slidably mounted on the frame for advancing and retracting the medium axially of the drums, and actuating means coupled to one of the drums and to the transducer for varying the distance between the drums and shifting the transducer relative to the medium respectively. In accordance with the preferred form of the invention, the carrier includes upwardly divergent side walls for supporting the medium during axial movement thereof relative to the drums and the carrier also includes abutment means for locating the medium relative thereto. The carrier preferably includes a base for supporting the medium during axial movement relative to the drums below the position imparted to the medium on the drums. The frame and carrier are preferably provided with interengaging guide means to facilitate movement of the carrier axially of the drums, the guide means preferably including a rail slidably mounted relative to the frame. It is contemplated that the carrier be separable from the frame and that detent means be provided to locate it relative to the frame.

The apparatus is preferably provided with means biasing one of the drums in a direction away from the other including means pivotally supporting one of the drums relative to the frame. The actuating means preferably includes a lever coupled to the movable drum through a link. The actuating means also preferably includes a lever coupled to the transducer through a cam. The actuating means preferably includes a lever pivotally supported by the frame, a link intermediate the lever and one of the drums and a cam intermediate the lever and the transducer. The carrier may contain a slot for reception of an index strip pertaining to intelligence carried by the medium. The carrier preferably includes inner and outer abutments for engaging the ends of the medium, the inner abutment being of less height than the outer abutment so that any movement imparted to the carrier while the medium is tensioned in the drums will not damage the medium.

A more complete understanding of the invention will follow from a description of the accompanying drawings wherein.

Figure 1:
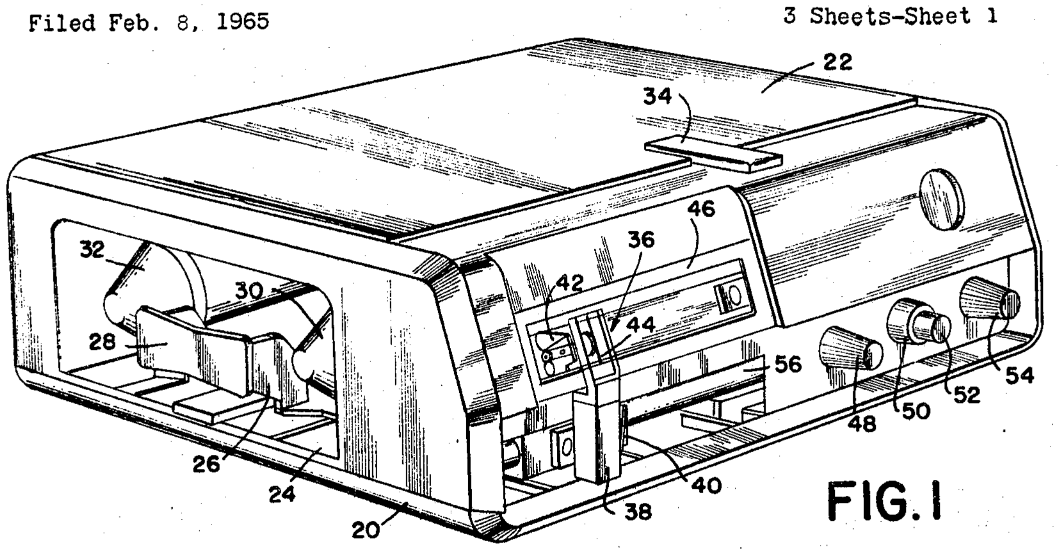
FIG. 1 is a perspective view of sound translating apparatus incorporating the present invention.

The sound translating apparatus depicted in the drawings employs a medium in belt form. Mounted on the base plate or frame 20 there is a housing or cover member 22 containing an opening 24 in its left end as viewed in FIG. 1 from which a belt loading tray or carrier 26 can be retracted by means of its handle 28 to receive a belt type record medium, whereupon the tray 26 will be moved inwardly during which the medium will be applied to the forward drum or mandrel 30 and the rear drum or mandrel 32. Before retracting the tray 26, a lever 34 exposed through the upper portion of the cover 22 will be rocked about its pivot to reduce the distance between the mandrels 30 and 32 to facilitate application and removal of belt media with respect to the mandrels, and this same pivotal movement of the lever 34 serves to retract the transducer head with respect to the path of the belt media during application and removal of such media with respect to the mandrels. Conversely, after the medium has been applied to the mandrels and the tray 26 has been moved to its innermost position as depicted in FIG. 1, the lever 34 will be rocked to its position depicted in FIG. 1 to separate the mandrels 30 and 32 sufficiently to produce proper tension in the belt medium and at the same time, the transducer head will be moved towards the path of the medium to its proper transducing position.

The transducing head, not shown in FIG. 1, is supported on a carriage 36, a portion of which extends forwardly from the front panel of the machine. The carriage is provided with a handle 38 which can be manually operated to shift the carriage by depressing a pivoted actuator 40. The carriage supports a marking assembly 42 and an indicating assembly 44 on opposite sides of a support 46 adapted to receive an index strip, not shown, which can be marked and interpreted in accordance with the actual intelligence carried by the record medium.

Accessible on the front panel are a tuning knob 48 for precise positioning of the transducer in relation with a recorded track on the medium, a playback tone control knob 50 with a volume control knob 52, a multi position selector knob 54 for any of a plurality of input signals, mainly voice signals appearing either at different levels or from different transducers permanently connected to the recorder.

Figure 2:
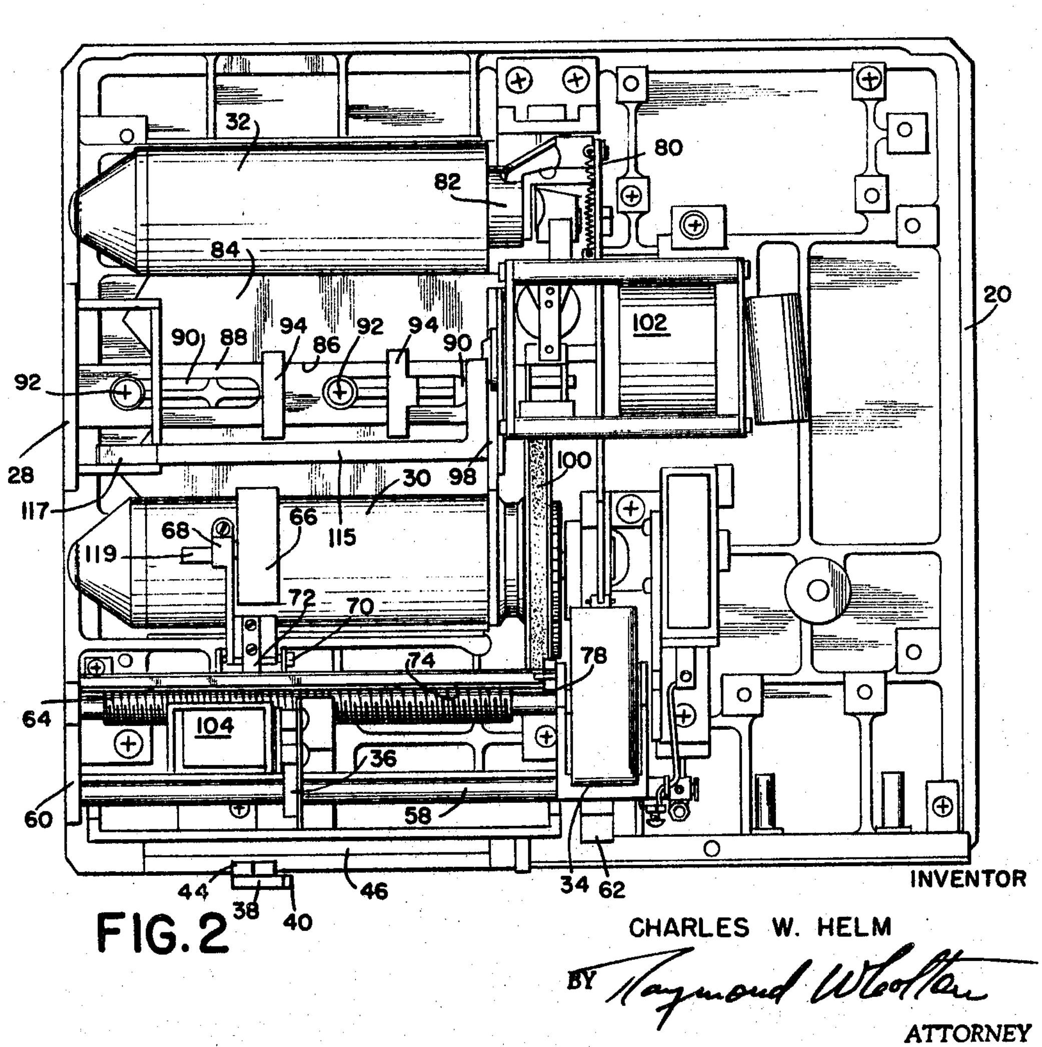
FIG. 2 is a plan view of sound translating apparatus like that shown in FIG. 1 with the cover removed and with certain other components removed for purposes of clarity.

The carriage 36 is supported on a lower guide rod 56, shown in FIG. 1 and an upper guide rod 58 shown in FIG. 2. These guide rods are supported in a pedestal 60 at the left end of the machine as shown in FIG. 2 and an intermediate pedestal 62 secured to the frame 20. Journaled in these pedestals is a lead screw 64 employed to impart both feeding and backspacing movements to the carriage 36, so as to cause the transducer 66 to move in a direction axially of the mandrels and of the belt medium when supported on the mandrels. The transducer 66 is carried by an arm 68 capable of rocking movement about a pivot 70 by which the transducer assembly is supported on the carriage. A follower 72 secured to the arm 68 projects beneath an elongated cam 74 which is substantially coextensive with the mandrel 30 and which is actuated by the lever 34 which carries a pin 76 (FIG. 4) received in a slotted arm 78 secured to the right end of the elongated cam 74 as viewed in FIG. 2.

The lever 34 is connected by means of a link 80 with a support 82 for the rear drum 32 so as to rock the support 82 about a pivot carried by the frame 20 whereby the spacing between the mandrels 30 and 32 will be varied to permit application and removal of the sleeve media.

Figures 3, 4:
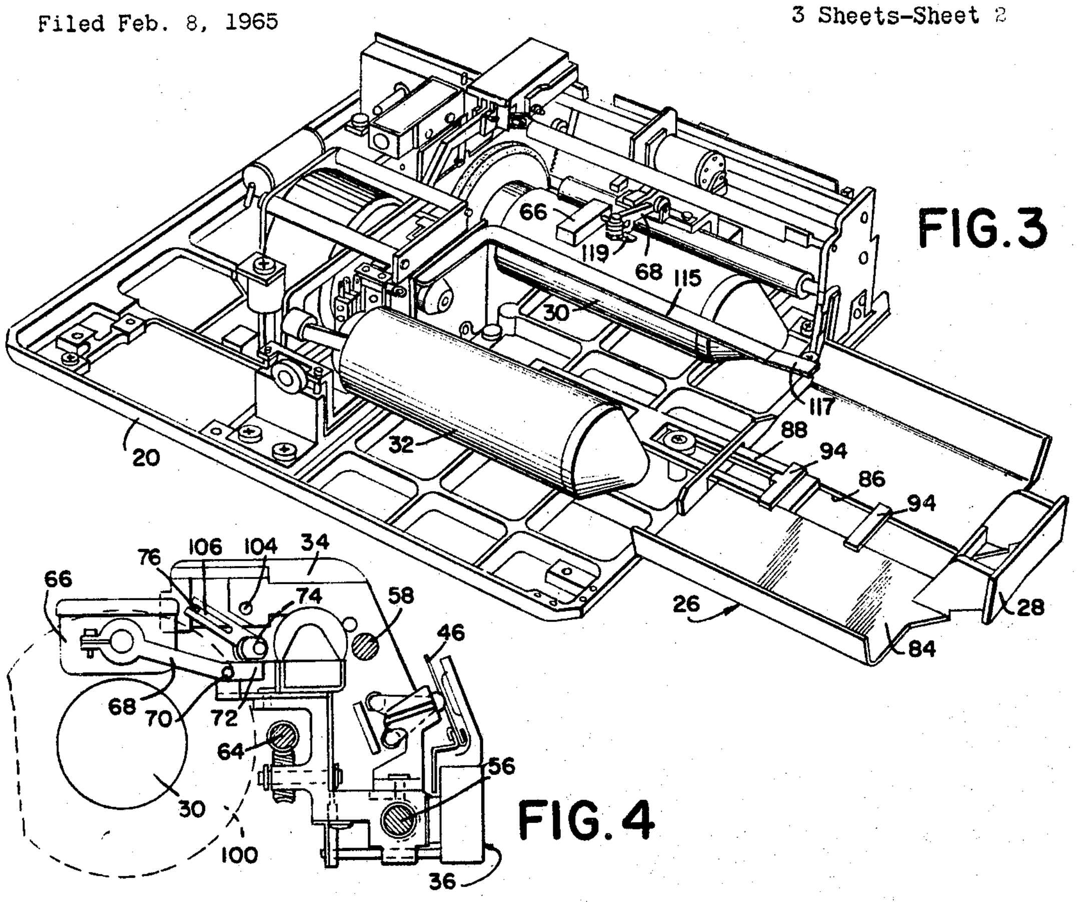
FIG. 3 is a perspective view of the apparatus of FIG. 1 with the cover removed and with a number of other components removed, and with the tray in extended position.
FIG. 4 is an elevation, partially in section depicting a portion of the carriage of the apparatus of the preceding figures.

Referring now to FIGURES 2 and 3 together, tray 26 has a bottom wall 84 containing a slot 86 receiving a guide 88 containing slots 90 which receive screws 92 on which the guide or rail 88 can slide. When the tray 26 is retracted, movement will be imparted to the tray itself as well as to the guide 88 to assure adequate support of the tray over a substantial portion of its length even when it is fully retracted. Intermediate bridges 94 are provided on the tray to suitably reinforce it. As may best be seen from FIGURE 6, tray provides an outboard abutment 96 and an inboard abutment 98 for properly locating a belt medium by engaging its ends.

The forward mandrel 30 carries an enlarged friction disc 100, in driving engagement with a suitable reducing train driven by a motor 102. The rear mandrel 32 is an idler and is rotated by its frictional engagement with a belt medium applied thereto. The motor 102 also, through suitable gearing, drives the lead screw 64.

The mechanism for shifting the position of the transducer 66 during the application and removal of belts to the mandrels has been depicted in FIG. 4. The lever 34 is shown as mounted on a pivot 104 so that when the lever is rotated, its pin 76 will move in the slot 106 of the arm 78 to rotate the elongated cam 74 so as to depress the follower 72 and elevate the arm 68 together with the transducer 66.

Figure 5:
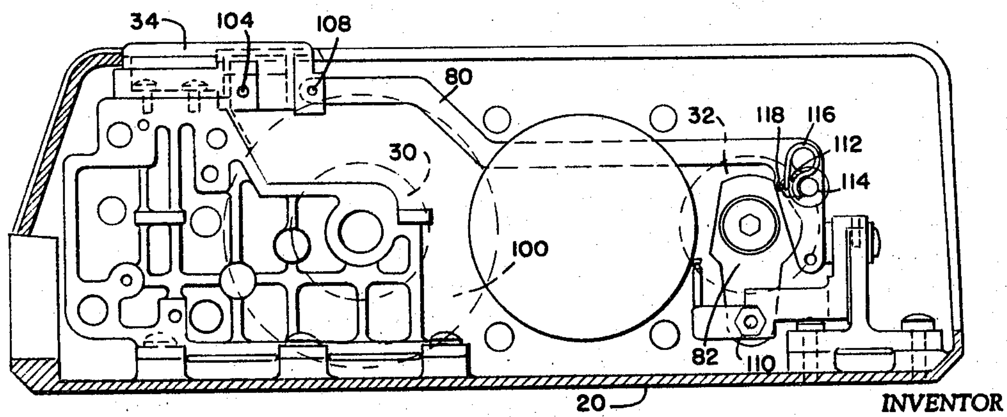
FIG. 5 is an elevation partially in section depicting mechanism for shifting the rear mandrel.

The details of the mechanism for displacing the rear drum or mandrel 32 has been depicted in FIG. 5. Actuation of the lever 34 about its pivot 104 will shift the link 80, connected to the lever by means of a pivot pin 108. The support 82 for the rear mandrel 32 is connected to the frame 20 by means of a pivot 110. The link 80 contains a slot 112 for the reception of a pin 114 carried by the support 82 and as will be evident from FIG. 5, the pin is biased towards the right end of the slot by means of a spring 116 interposed between the pin and a pin 118 on the support 82. Accordingly, it will follow, that the degree of tension imposed upon the belt medium carried by the mandrels will be determined by the force of the spring 116. With the lever 34 actuated, the rear mandrel 32 will be rocked towards the forward mandrel 30 at the same time the transducer 66 is elevated so that the belt medium can be removed or applied to the mandrels with great facility.

Referring again to FIGURES 2 and 3 on the frame 20, there is provided a guide or hold-down arm 115 terminating in an upwardly inclined portion 117, serving to limit movement of the record medium radially of the drums to prevent interference between the medium and the cover member 22 or its contents. Another guide or shoe 119 having an inclined lower surface is carried by the arm 68 to direct the belts below the transducer 66.

Referring to FIGS. 6 to 12, it will be apparent that the side walls 120 of the tray or carrier 26 are upwardly divergent to suitably support the belt medium. The edges 122 defining the slot 86 of the tray assume the form of tongues for cooperation with grooves 124 formed in the edges of the guide 88.

Figures 6, 7, 8, 9, 10, 11:
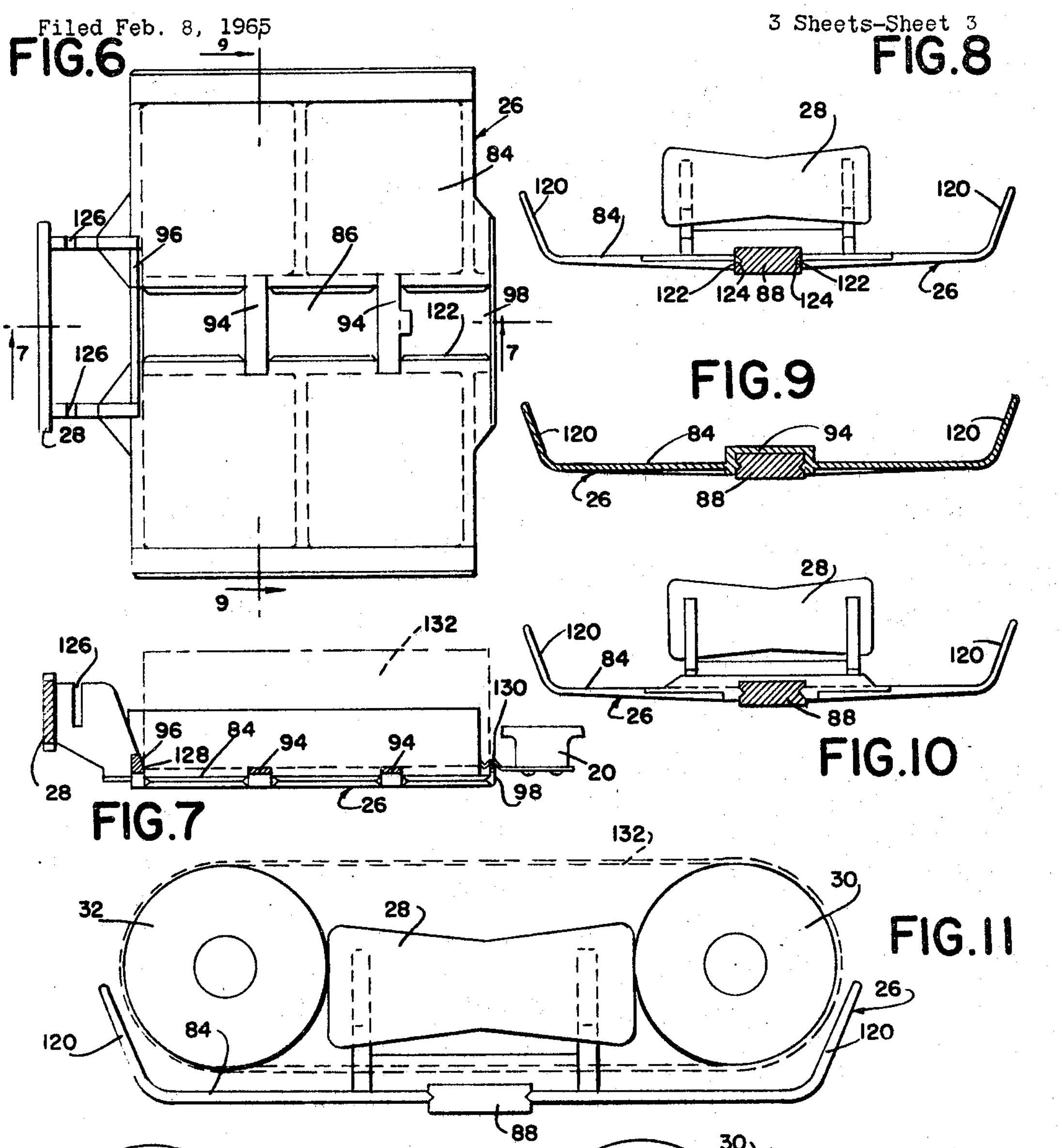
FIG. 6 is a plan view of the tray.
FIG. 7 is a section taken along line 7—7 of FIG. 6 shown in conjunction with a detent for locating the tray relative to the frame.
FIG. 8 is an elevation of the tray looking from the left end of FIG. 6.
FIG. 9 is a sectional elevation of the tray taken along line 9—9 of FIG. 6.
FIG. 10 is an elevation of the tray looking from the right end of FIG. 6.
FIG. 11 is a somewhat schematic showing of the relationship between the tray, the drums, and a record medium supported on the drums in condition for operation.

As depicted in FIGS. 6 and 7, a portion of the tray adjacent the handle 28 may contain slots 126 for the reception of an index strip associated with the intelligence recorded on the belt received in the tray. When a belt is dropped into the tray, one of its edges will engage the inboard abutment 98 and its other edge will engage the outboard abutment 96, and as will be apparent from FIG. 7, the inner surface of the abutment 96 is inclined at an angle of about 5° to the vertical so that engagement of the edge of the belt with this surface 128 will rather precisely locate the belt in the carrier. Then, when the belt is advanced together with the tray towards the mandrels, the tapered ends of the mandrels will enter the belt and further movement of the tray will cause the belt to ride up the inclined portions of the mandrels until the tray has been moved to its innermost position. This innermost position can be controlled by means of a detent 130, shown in FIG. 7, carried by the frame 20 for engagement with the inboard abutment 98.

It will be observed that the inboard abutment 98 is of appreciably less height than the outboard abutment 96 so that if the tray is inadvertently retracted while the belt 132 is under tension on the mandrels, the inboard abutment will not engage the belt in its elevated position and will therefore not damage it.

Figure 12:
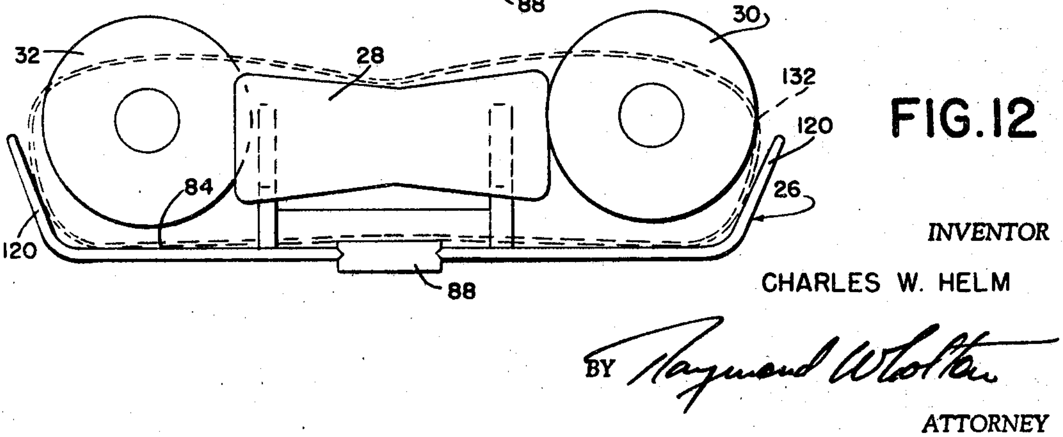
FIG. 12 is a schematic showing similar to that of FIG. 11 depicting the position assumed by the record medium on the tray as the tray is being advanced towards or retracted from the drums.

A belt 132 has been depicted in FIG. 11 as under tension on the mandrels 30 and 32 and elevated above all surfaces of the tray or carrier 26. In FIG. 12, such a belt has been depicted as supported solely by the tray or carrier 26 prior to application of the belt to the mandrels or after it has been retracted from them.

It will be evident that the tray can be completely separated from the frame so that it will not be necessary to actually remove a belt from its tray. Under these circumstances, after a recording has been completed, the operator will elevate the lever 34 to decrease the distance between the mandrels and elevate the transducer, whereupon the handle 28 of the tray can be grasped and the tray together with the belt removed from the frame, whereupon the related index strip can be placed in the slots 126 formed in the tray adjacent the handle. Then another tray containing another belt and supporting its associated index strip can be applied to the frame, the index strip removed and placed in the support 46, the tray advanced to its innermost position and at that time, the lever 34 can be lowered to move the transducer adjacent to the belt and simultaneously move the mandrels apart so as to place the belt under tension.

Whereas the foregoing description has been based upon a single embodiment of the invention, such variations as will suggest themselves to those skilled in the art are contemplated.

I claim:

1. In sound translating apparatus having a frame, a pair of drums each rotatably supported at one end by said frame to receive on their other ends an endless belt record medium, a transducer movably mounted on said frame to scan said medium in a direction axially of said drums, and means for rotating said drums and imparting scanning movement to said transducer, the improvement comprising:

a removable carrier for said record medium, said carrier being slidably mountable on said frame for advancing and retracting said medium axailly of said drums, said carrier comprising:

a base for supporting said medium during axial movement thereof relative to said drums; and oppositely disposed side walls extending upwardly from said base; and actuating means coupled to one of said drums and to said transducer for varying the distance relative to said medium respectively.

2. Sound translating apparatus according to claim 1 wherein said side walls of said removable carrier are divergent and further support said record medium during axial movement thereof relative to said drums.

3. Sound translating apparatus according to claim 1 wherein said carrier includes abutment means extending perpendicularly upwardly from said base on the same side thereof as said side walls for locating said medium relative thereto.

4. Sound translating apparatus according to claim 3 wherein said abutment means comprises inner and outer abutments for engaging the ends of said medium, said inner abutment being of less height than the outer abutment, whereby said inner abutment will engage the inner end of said medium for retraction of said medium with said carrier when the distance between said drums is reduced.

5. Sound translating apparatus according to claim 1 wherein said frame and carrier are provided with interengaging guide means to facilitate movement of said carrier axially of said drums.

6. Sound translating apparatus according to claim 5 wherein said guide means includes a rail slidably mounted relative to said frame.

7. Sound translating apparatus according to claim 1 wherein said frame and carrier are relatively located by detent means.

8. Sound translating apparatus according to claim 1 including means biasing one of said drums in a direction away from the other.

9. Sound translating apparatus according to claim 1 including means pivotally supporting said one of said drums relative to said frame.

10. Sound translating apparatus according to claim 1 wherein said actuating means includes a lever coupled to said one of said drums through a link.

11. Sound translating apparatus according to claim 1 wherein said actuating means includes a lever coupled to said transducer through a cam.

12. Sound translating apparatus according to claim 1 wherein said actuating means includes a lever pivotally supported by said frame, a link intermediate said lever and said one of said drums, and a cam intermediate said lever and said transducer.

13. Sound translating apparatus according to claim 1 wherein said actuating means includes a lever pivotally supported by said frame, a link pivoted to said lever, a support for one of said drums pivoted to said frame and means connecting said link to said support.

14. Sound translating apparatus according to claim 13 wherein said actuating means further includes an elongated cam rotatably mounted in said frame and extending coaxially with said drums, a pin and slot connection between said lever and said cam, and follower means interconnecting said transducer and said cam.

15. Sound translating apparatus according to claim 1 wherein said carrier contains a slot for reception of an index strip pertaining to intelligence carried by said medium.

16. Sound translating apparatus according to claim 1 including guide means supported by said frame for limiting movement of said medium radially of said drums.

References Cited

UNITED STATES PATENTS

| | | | |
|---|---|---|---|
| 3,056,606 | 10/1962 | Scheuler et al. | 274—17 |
| 3,256,025 | 6/1966 | Wolfner et al. | 274—17 |

LEONARD FORMAN, *Primary Examiner.*

F. J. D'AMBROSIO, *Assistant Examiner.*